Nov. 18, 1969     S. B. ROBBINS     3,479,478
CANTILEVERED CONTACT BLADE AND RETURN SPRING
WITH REVERSELY BENT PORTION
Filed Aug. 9, 1967

INVENTOR.
*Samuel B. Robbins*
BY
*Donald P. Selucki*
ATTORNEY

United States Patent Office 3,479,478
Patented Nov. 18, 1969

3,479,478
CANTILEVERED CONTACT BLADE AND RETURN SPRING WITH REVERSELY BENT PORTION
Samuel B. Robbins, Rochester, Mich., assignor to General Motors Corporation, Detroit, Mich., a corporation of Delaware
Filed Aug. 9, 1967, Ser. No. 659,355
Int. Cl. H01h 3/02
U.S. Cl. 200—153                              3 Claims

ABSTRACT OF THE DISCLOSURE

This closure relates to an electric switch of the double pole, double throw variety which is adapted for use in a circuit bringing about a reversal of the direction of rotation of a permanent magnet field motor. This double pole, double throw switch has a neutral position and utilizes a pair of leaf spring conductors for centering the actuator in a neutral position, said leaf springs completing a circuit to the motor armature at both extremes of deflection.

---

This invention relates to electric switches and more particularly to an electric switch adapted to operate in a circuit to reverse the direction of rotation of a permanent magnet field motor.

Power window switches on vehicles generally operate in a circuit in which a split field winding type electric motor is used to power the windows up and down. The reversal of rotational direction of this type motor is brought about by merely changing one electrical connection at opposite ends of the split field. Permanent magnet motors incorporate a permanent magnet field which has a fixed polarity and, therefore, the reversal of motor direction can be brought about only by changing the polarity of a wound armature. The simplest way of changing the polarity in the armature circuit is to change a ground at either end of the armature so that voltage from a power source is applied in the armature circuit with a different polarity depending on which ground is chosen. Therefore two switching functions are required to select a direction of motor rotation with a third neutral position being required when operation of the motor is not desired. The present invention provides the necessary number of switching functions while utilizing a switch having very few parts while keeping within the design parameters conventionally applied to power window switches.

It is therefore an object of the present invention to provide an improved electric switch having a double pole, double throw capability along with a neutral position which is simple in construction and, consequently, economical to manufacture.

It is another object of the present invention to provide an improved electric switch adapted to change the polarity in the armature circuit of a permanent magnet motor to effect rotational directional changes therein.

It is still another object of the present invention to provide an improved power window regulator for use with permanent magnet motors which utilize the same structural parts to effect circuit changes that are used to resiliently center an actuator in a neutral position.

Further objects and advantages of the present invention will be apparent from the following description, reference being had to the accompanying drawings wherein a preferred embodiment of the present invention is clearly shown.

Figure 1:
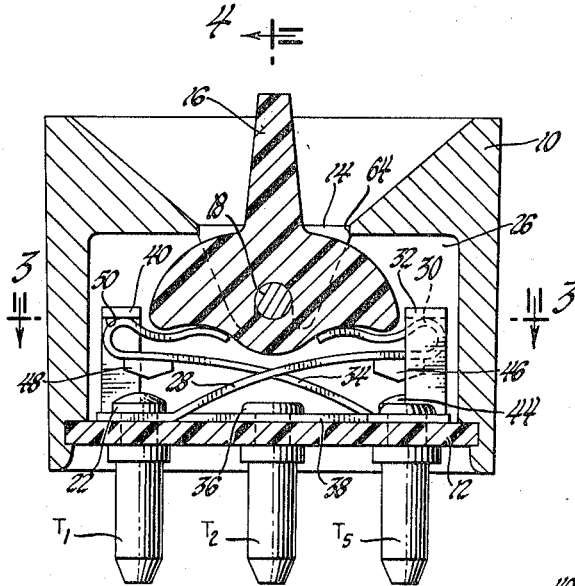
FIGURE 1 is a sectional view of the switch of the subject invention, the switch shown in the neutral position.

Referring to FIGURE 1, a switch housing 10 has a base portion 12 closing one end thereof and an aperture 14 formed in an opposite end thereof.

Figure 4:
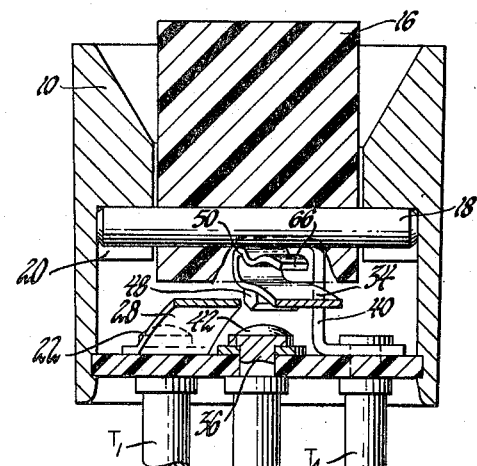
FIGURE 4 is a sectional view of the subject invention taken along line 4—4 of FIGURE 1.

Referring to FIGURE 4, an actuator 16 has a pin 18 passing therethrough received in a slot 20 formed in housing 10 to give actuator 16 a pivoting capability.

Referring to FIGURE 1, terminals $T_1$, $T_2$ and $T_3$ are illustrated as being carried in base portion 12 with rivet heads 22 and 24 formed in the switching chamber 26. Rivet head 22 passes through a resilient leaf spring member 28 and firmly holds $T_1$, base portion 12 and leaf spring 28 firmly engaged. Leaf spring 28 is shown in FIGURE 1 in its free form wherein contacting end 30 engages a fixed substantially Z-shaped contact 32. In similar fashion, rivet head 24 holds another resilient leaf spring member 34 operatively positioned with respect to base portion 12 and $T_3$. $T_2$ has a flat rivet head 36 which maintains conductive strip 38 operatively positioned. Z-shaped contact 32 has a counterpart 40 against which resilient spring member 34 normally bears. The configuration of contacts 32 and 40 are clearly illustrated in FIGURE 4.

Referring to FIGURE 4, terminal $T_4$ is shown as being similar to terminal $T_2$ and serves to operatively position Z-shaped fixed contact 40. Not shown is terminal $T_5$ that is similar to terminal $T_4$ and similarly operatively positions contact 32.

Figure 3:
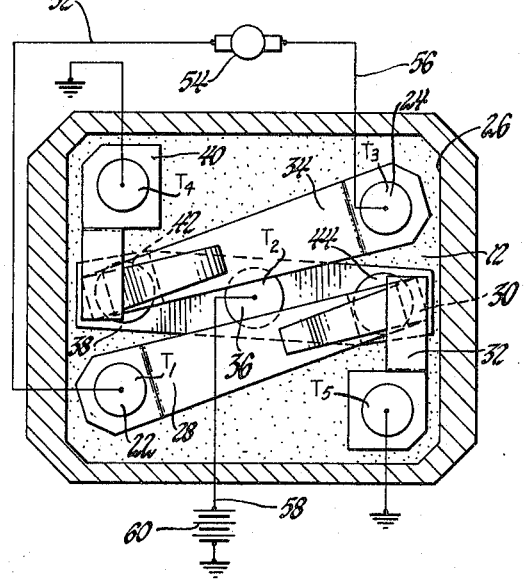
FIGURE 3 is a sectional view of the subject invention taken along line 3—3 of FIGURE 1 with an electrical circuit shown diagrammatically to illustrate the environment in which the subject switch normally functions.

Referring to FIGURE 3, a plan view of the inside portion of base portion 12 is shown with the contact layout clearly illustrated. It is seen that conductive strip 38 is in electrical engagement with terminal $T_2$ and includes rivet contacts 42 and 44 positioned near the extremities thereof.

Referring to FIGURE 1, it is seen that leaf springs 28 and 34 carry contact heads 46 and 48, respectively, that are adapted to move into conductive relationship with rivet contacts 44 and 42, respectively. Therefore, contact strip 28 has a contact end 30 adapted to engage Z-shaped fixed contact 32 at one extreme of movement and contact head 46 adapted to engage rivet contact 44 at another extreme of movement. In a similar fashion, spring contact 34 has a contact end 50 adapted to engage fixed Z-shaped contact 40 at one extreme of movement and rivet contact 42 at another extreme of movement.

Referring to FIGURE 3, an electric circuit is diagrammatically shown in which $T_1$ connects through lead 52 with one end of an armature winding of permanent magnet motor 54 while $T_3$ connects through lead 56 with an opposite end of the armature winding of motor 54. $T_2$ connects through lead 58 with battery 60 while $T_4$ and $T_5$ connect with the ground. An examination of FIGURE 3 clearly shows that, when leaf spring 28 is depressed into engagement with rivet contact 44, contact with Z-shaped contact 32 is broken and battery power is available in lead 52. At the same time, contact end 50 of leaf spring contact 34 remains in engagement with Z-shaped contact 40 completing the circuit through the motor and lead 56 to ground. This contact arrangement is better seen in FIGURE 2 wherein actuator 16 is shown in one of its operative positions. With actuator 16 pivoted in an opposite direction from that shown in FIGURE 2, the switching is reversed from that previously described with leaf spring contact 28 remaining stationary and leaf spring contact 34 being deflected. It is clear that the polarity in the armature of motor 54 is thereby reversed effecting a reversal of motor rotation.

Figure 2:
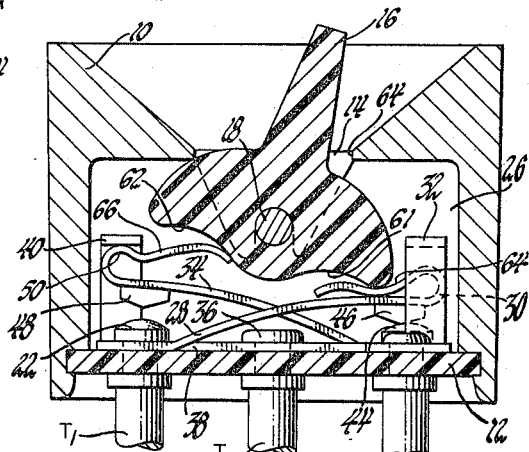
FIGURE 2 is a sectional view of the switch of FIGURE 1 with the switch shown in an actuated position.

Referring to FIGURE 2, another feature of the subject invention is illustrated. Cam surfaces 61 and 62, integrally formed with actuator 16, cooperate with cam follower portions 64 and 66, respectively. Cam follower portions 64 and 66 are formed in the bent-over portion of the leaf spring near its extremity providing an added resilience for leafsprings 28 and 34 and serve to maintain actuator 16 operatively positioned in slot 20 as well as centering actuator 16 after pressure is released from the end thereof. It is clear also that in the pivoting of actuator 16 to a position shown in FIGURE 2, it is important that contact end 50 remain in engagement with Z-shaped fixed contact 40. The end of cam follower portion 66 maintains a pressure against cam surface 62 even while contact end 50 engages fixed contact 40. The tangential pressure of follower 66 against surface 62 assists the cam follower portion 64 in centering actuator 16 when pressure is released.

In operation, switch housing 10, attached in any well-known manner to a support in the driving compartment of the vehicle, presents the end of actuator 16 at a point where it is manipulable by the vehicle operator. Actuator 16 is tilted on its pivotal mounting in either of two directions depending on the desired direction of rotation of permanent magnet motor 54. Assuming that the desired direction of rotation requires a movement of actuator 16 toward the right, as viewed in FIGURE 2, cam surface 61 depresses cam follower portion 64 toward the main body of spring member 28. Concurrently, contact end 30 separates from fixed contact 32 breaking the ground through $T_5$. The ground connection $T_4$ remains energized. Further movement of actuator 16 drives contact head 46 into rivet contact 44. Rivet 44 conductively engages $T_2$ through strip 38 resulting in power from battery 60 being connected to motor 54 through spring member 28 and lead 52.

It should be noted that a reverse pivoting of actuator 16 merely breaks the ground through $T_4$ and connects power to motor 54 through $T_2$ strip 38, spring member 34 and lead 56. The ground through $T_5$ has not been disturbed and the polarity through motor 54 is reversed resulting in motor rotation in the opposite direction. The switch is very positive in its operation in that, when resistance is felt against actuator 16 by the operator, the contact between either head 46 or head 48 has been established between 44 and 42 thereby completing the motor circuit. This is an important feature when an operator cannot be readily apprised of the result of the switch actuation in an environment where the motor noise cannot accomplish this.

While the embodiment of the present invention, as herein disclosed, constitutes a preferred form, it is to be understood that other forms might be adpoted.

What is claimed is:

1. An electric switch for use in selectively controlling energization and de-energization of a plurality of electric circuits comprising: a switch housing means including a base at one end thereof; a plurality of spaced fixed contacts carried by said base and having contact surfaces disposed interiorly of said switch housing means; an actuator pivotally supported by said switch housing means for movement in opposite directions from a center position; a plurality of spaced leaf springs carried by said base and engaging said actuator along its underside to bias the same towards its center position, each of said leaf springs adjacent one end thereof being fixed to one of said fixed contacts and having its free end normally disposed above another of said fixed contacts, each of said leaf springs including a main portion extending upwardly from said base and a reversely bent portion normally spaced from said main portion and which engages the underside of said actuator, said actuator when pivoted in either direction from its center position causing the reversely bent portion of one of said leaf springs to be deflected towards the main portion thereof while both portions are being deflected toward and into engagement with the another of said fixed contacts to provide a conductive path from one to another of said fixed contacts.

2. A window regulator switch for use in controlling the direction of rotation of an electric motor of a window regulator mechanism of an automotive vehicle comprising: a switch housing means having a base at one end; a manually manipulatable actuator pivotally supported by said switch housing for movement in opposite directions from a center position; a plurality of spaced fixed contacts carried by said base portion, said fixed contacts having contact surfaces facing interiorly of said switch housing; and spaced flexible leaf spring members carried by said base portion and each being fixed to one of said fixed contacts adjacent one end thereof and having its free end disposed above another of said fixed contacts, said flexible leaf spring members each having a main portion and a reversely bent portion spaced from the main portion in which is engageable with said actuator along its underside to bias the same toward its center position, said actuator along its underside having concavely shaped portions and said reversely bent portions having convexly shaped sections which cooperably engage the concavely shaped portions of the actuator, said actuator when pivoted in either direction from its center position causing the reversely bent portion of one of the leaf springs to be flexed toward the main portion while both portions are being flexed toward and into engagement with another of said fixed contacts to provide a conductive path from one to another of said fixed contacts.

3. An electric switch for reversing the direction of rotation of a permanent magnet field motor comprising: a switch housing having a base portion at one end, a manually manipulatable actuator pivotally supported by the switch housing for movement in opposite directions from a center position; a plurality of spaced fixed contacts carried by said base portion and with first, second and third ones being adapted to be electrically connected with a power source, an armature of the permanent magnet motor and to ground, respectively, said first and second ones of said fixed contacts having contact surfaces disposed interiorly of the switch housing adjacent the base, said third ones of said fixed contacts being substantially Z-shaped members having contact surfaces spaced from and aligned with certain ones of said first fixed contacts, a plurality of leaf spring members carried by said base and engageable with said actuator along its underside to bias the same toward its center position, the leaf spring members being fixed to associated ones of said second fixed contacts at one end thereof and having their free ends normally in engagement with associated ones of said third contacts, said leaf spring members including a main portion and a reversely bent portion spaced from the main portion and which engages the underside of said actuator, said actuator along its underside having concave surfaces and said reversely bent portions of said leaf spring members having convex sections which cooperably engage the concave portions of the actuator, said actuator when pivotally moved in either direction from its center position causing one of the leaf spring members to disengage its associated third contact, causing the reversely bent portion to be flexed toward the main portion while both portions are being flexed toward and into engagement with said associated first contact whereby the conductive path between the associated second and third contacts is broken prior to establishing a conductive path between the associated first and second contacts to provide a current path therebetween.

References Cited

UNITED STATES PATENTS

| | | | |
|---|---|---|---|
| 2,909,624 | 10/1959 | Colautti | 200—153.10 XR |
| 2,966,559 | 12/1960 | Meyer | 200—153.10 XR |
| 2,968,703 | 1/1961 | Meyer et al. | 200—153.10 XR |
| 2,947,828 | 8/1960 | Neely | 200—166.1 X |
| 3,242,296 | 3/1966 | Woolley | 200—166.1 |

FOREIGN PATENTS 1,012,648 7/1957 Germany.

ROBERT K. SCHAEFER, Primary Examiner

ROBERT A. VANDERHYE, Assistant Examiner

U.S. Cl. X.R.

200—6, 166